April 26, 1960     J. A. MORRISON     2,933,890
NOZZLE CLOSING JET DEFLECTORS

Filed Jan. 20, 1955     3 Sheets-Sheet 1

INVENTOR.
JOHN A. MORRISON
BY
Reynolds, Beach & Christensen
ATTORNEYS

INVENTOR.
JOHN A. MORRISON
BY
Reynolds, Beach & Christensen
ATTORNEYS

April 26, 1960 J. A. MORRISON 2,933,890
NOZZLE CLOSING JET DEFLECTORS
Filed Jan. 20, 1955 3 Sheets-Sheet 3

INVENTOR.
JOHN A. MORRISON
BY
Reynolds, Beach & Christensen
ATTORNEYS

United States Patent Office 2,933,890
Patented Apr. 26, 1960

2,933,890

NOZZLE CLOSING JET DEFLECTORS

John A. Morrison, Seattle, Wash., assignor to Boeing Airplane Company, Seattle, Wash., a corporation of Delaware Application January 20, 1955, Serial No. 482,920

2 Claims. (Cl. 60—35.54)

Jet deflectors of various designs have been devised for intercepting the gases issuing rearwardly from the jet nozzle of an engine for propulsion of an aircraft or other vehicle, and deflecting them forwardly to the greatest extent practicable, in order to develop rearward thrust to decelerate a just-landed aircraft, comparable to the rearward thrust of an engine with propeller blades reversed in pitch. Heretofore such devices, in the forms most generally employed, have dealt with the gases after they have issued from the jet nozzle, at maximum velocity, and vanes, cones, gutters and the like, located in use behind the jet nozzle, have been the means principally adopted for reversal of thrust.

The interception, containment, and reversal of such high velocity gases, at very high temperatures, have involved serious problems, some of which could be lessened or eliminated if the gases issued at lower velocity.

In addition, the location of thrust reversers, in use, to the rear of the jet nozzle exit has involved problems connected with the mounting and movement of the reversers. They can not remain in thrust reversing position during normal flight, but must be retracted in some way, yet when required must be movable immediately into operative position, where they are exposed to the airstream, to the extremely high temperature of the impinging gases, and their connection to the airframe structure must be sufficiently strong and rugged to withstand and to transmit to the airframe the full thrust of the engine's exhaust, plus the relative airflow, notwithstanding their projection from and movement relative to their supporting structure.

Finally, their small area, consonant with the concentration of the issuing jet, has produced high loading, and difficulty in producing a design that could effectively intercept, contain, and deflect the entire jet.

According to the present invention no deflector separate from the engine is employed. Rather, the deflector is built into the engine, and when required serves to close completely the jet nozzle, thereby intercepting the greater part of the exhaust gases. These intercepted gases escape by way of an annular gap which at that time is opened in the jet engine housing ahead of the nozzle-closing means, but behind the combustion chamber. Because the interception, and the exit of the intercepted gases, occurs in the larger portion of the nozzle, instead of at or behind its small rear exit, the velocity of these gases is appreciably less than those with which deflectors have dealt heretofore. The annular gap itself becomes a nozzle, and the exiting gases can be speeded up to any desired velocity, and their tendency is to cling to the housing ahead of the annular gap, and so to direct the thrust almost directly forwardly, rather than merely radially outwardly, as is the case in certain thrust reversers heretofore employed. The deflector units, by reason of their mounting upon a part of the engine, in the vicinity of the jet nozzle, are constantly at an elevated temperature, and the temperature difference when they are suddenly put in use is not so great as to cause difficulties of design. Also, being a part of the engine, whence forward thrust is imposed upon the airframe, the reverse thrust is equally strongly transmitted to the airframe.

It has been proposed to construct the housing of a jet engine with an annular gap having deflectors to direct exiting gases forwardly, located ahead of the normal tailpipe exit of the gases, and to close or to open that gap by rearward or forward bodily displacement of the innercone with respect to the fixed annular nozzle. The bodily displacement of the innercone for such a purpose is complicated by a number of structural considerations; moreover, the rearward nozzle-closing displacement of the innercone tends to increase the jet velocity hence the forward thrust, which on the contrary should be decreased at such time, just prior to or during initiation of rearward thrust. It has been found greatly preferable to leave the innercone undisturbed, to shift rearwardly relative thereto an annulus which during forward thrust conditions surrounds the innercone and cooperates therewith to define the annular jet nozzle, and to utilize separate nozzle-closing or deflector units which at the proper time are quickly moved into nozzle-closing position, generally in a plane transverse to the axis of the jet. Thereby the enlargement of the annular jet nozzle by the rearward displacement of the annulus decreases the velocity of the gases and their forward thrust; the opening of the gap affords an exit available for the gases; and the closing off of the annular nozzle terminates abruptly the already decreased forward thrust, and converts it into reverse or rearward thrust.

The form the jet deflector units assume is not in itself of prime importance, yet the location and arrangement of the device as a whole lends itself to the use of a series of iris vanes or leaves as such units. They may be mounted upon the structure which defines the exterior of the jet nozzle, to swing inwardly to the innercone for closing the nozzle; an angularly oscillatable ring will swing them all simultaneously and alike, and this actuator ring can be connected to the gap-opening mechanism so that it is automatically oscillated in the sense to close the nozzle when the gap-opening mechanism is moved in the sense to open the gap, and vice versa.

While the gap may be opened in various ways, or by movement of gap-closing doors, it has been found quite practicable to make the rear terminus of the engine housing as an annulus which is bodily shiftable rearwardly relative to its fixedly mounted forward portion, to open a gap between the forward terminus of the annulus and the rear terminus of the housing proper. The forward edge of the annulus can be formed with a skirt directed forwardly from the location of the jet deflecting units, so that the gases which are intercepted by the latter are all contained and directed forwardly by the skirt, before they can escape past the forward edge of the skirt, thereby most efficiently utilizing and directing all the force available, and cooperating with the rear end of the housing to define the reverse nozzle referred to above.

The illustrated construction, which shows more or less diagrammatically a practicable form, although not necessarily the form best suited for actual use, will make clear the principles of this invention, and the novel features thereof will appear in the appended claims.

Figure 1:
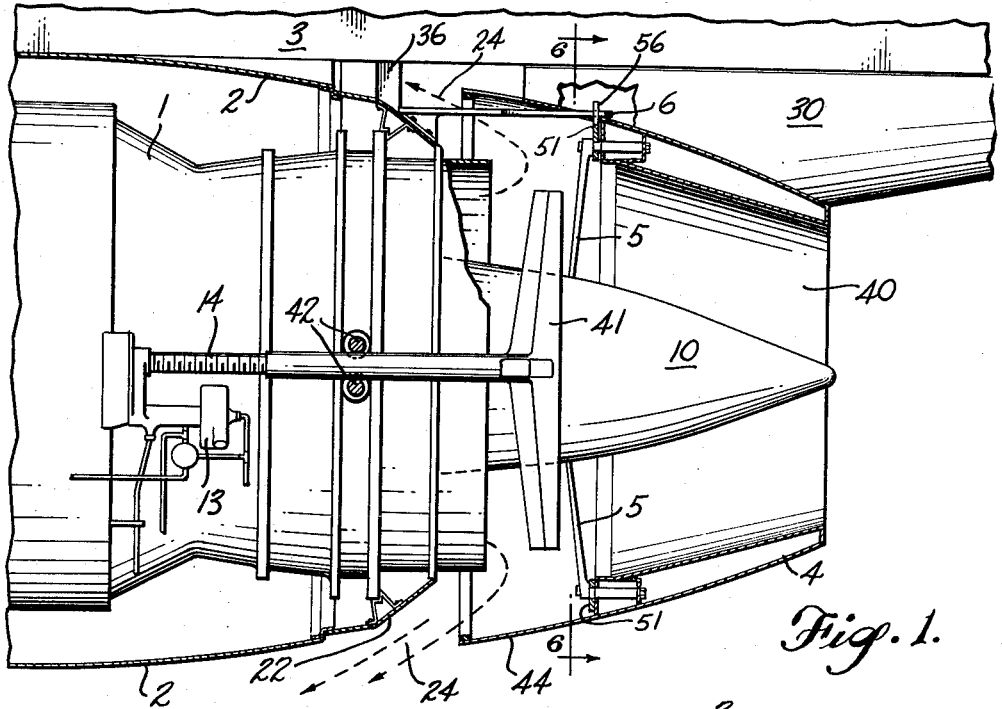
Figure 1 is a side elevational view, with certain parts in section on a vertical longitudinal plane, more or less along the axis of the engine, showing the gap open and the jet nozzle closed, to effect reversal of thrust.

The jet engine is of normal type, such as includes a combustion chamber 1 and a streamlined exterior housing 2, of which only the rear portion is shown, the whole mounted at the lower end of a strut 3 depending from the wing (not shown) of an airplane. The gases under normal flight conditions issue rearwardly from the combustion chamber 1 (speaking generally) through a jet nozzle which usually is integral with the combustion chamber and housing, but which, in the embodiment chosen to illustrate the principles of this invention, constitutes a terminal separate annulus 4 or similar jet nozzle means. An innercone 10 is shown, as is usual, and this is preferably supported from and may be integral with the structure which defines the combustion chamber 1, or may be independently shiftable longitudinally relative thereto, for regulation of forward thrust. The jet nozzle is defined in the annular space between the annulus 4 and the innercone 10, and is progressively narrowed down toward the rear exit 40.

The annulus 4 is mounted for bodily shifting in the direction axially of the engine, that is, forwardly and rearwardly, to open and to close a gap 24 between itself and the fixedly mounted structure ahead of it. Curved brackets 41 whereon the annulus is mounted, are guided at 42, and are shiftable by screw means 14 and a motor 13, under control of the pilot or other crew member. It will be understood that the gap-opening means may be of any suitable form or type, and that the actuating mechanism shown has been chosen primarily to illustrate the principle involved, rather than as representing necessarily that which would be employed in practice.

Figure 3:
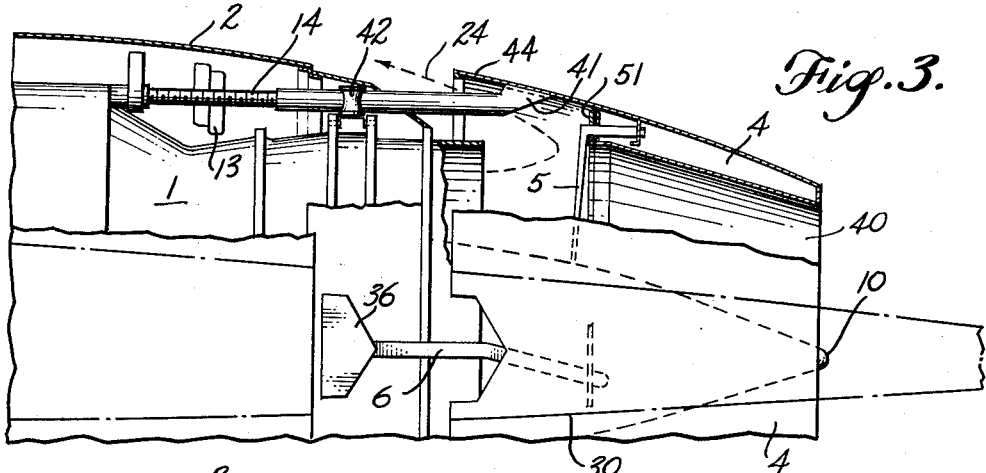
Figure 3 is a partial horizontal sectional view, with parts in the position corresponding to Figure 1.

Because the supporting strut usually joins the rearwardly and inwardly tapered rear end of the engine, which rear end now shifts bodily rearwardly, the immediately adjoining portion of the strut, at 30, may be mounted upon the annulus 4, to shift with the latter. In the position of parts for normal flight, with the gap closed, the strut portion 30 constitutes a faired continuation of the strut 3, and when the annulus is shifted rearwardly, into the position of Figures 1 and 3, the strut portion shifts therewith. It also houses in certain operating mechanism, referred to hereinafter.

The nozzle-closing means are of a type to close off, substantially completely and positively, the nozzle at some point intermediate the combustion chamber 1 and the rear exit 40. This closure must, of course, be to the rear of the gap 24, but preferably is located well forwardly, so that the interception of the gases occurs in the region wherein they have minimum velocity and pressure (as compared to their velocity and pressure at the more restricted rear exit 40). Whether the intercepting means be supported upon the innercone or upon the annulus, or otherwise, is not functionally material, although for simplicity of control, adequacy of room for storage when retracted, and better cooling during normal flight, it is preferred that they be supported upon the annulus. The shifting of the annulus can be employed to effect projection of the nozzle-closing units into operative (nozzle-closing) position, and retraction therefrom.

Figure 6:
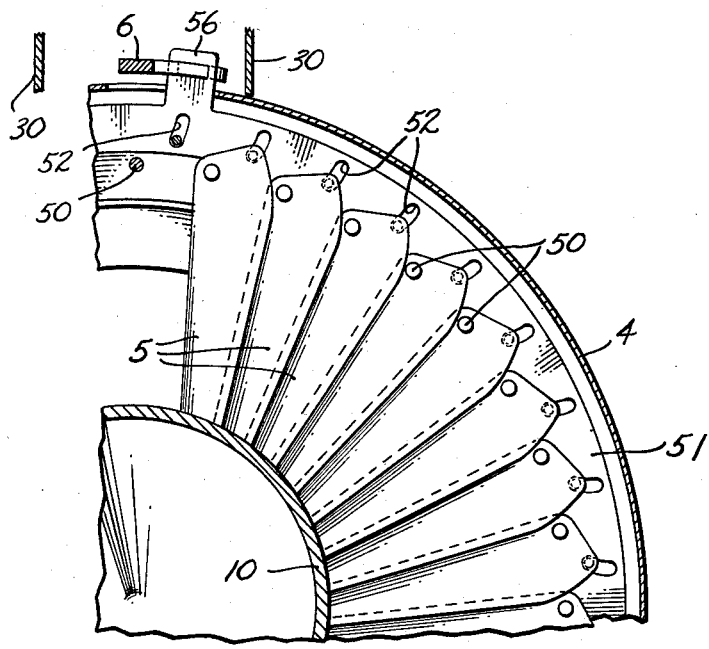
Figure 6 is a transverse partial sectional view along the line 6—6 of Figure 1.

Their form, too, is not material in the broadest sense, yet because it is desirable that the interception be abrupt, and in a zone close to the gap 24, it has been found convenient to make them as a series of iris vanes or leaves 5 distributed about the nozzle, each individually pivotally mounted at 50 upon the annulus 4, out of the direct normal path of the hot gases. Each iris leaf 5 is of a length to extend inwardly to the innercone 10, when swung inwardly, and of a shape such that, in conjunction with the other iris leaves, it will close the nozzle when so swung inwardly, as in Figure 6. On the other hand, when swung outwardly as in Figure 7, the series of iris leaves is withdrawn into an inactive position, within a recess in the interior of the nozzle, out of the path of issuing gases. A ring 51 which is oscillatable about the axis of the annulus 4, and which is connected by pin and slot connections 52 to the individual leaves 5, constitutes an actuator for swinging the leaves between their retracted position, as in Figures 2, 4, and 7, and their projected, nozzle-closing operative position, as in Figures 1, 3, 5, and 6.

The gap-opening means and the nozzle-closing means might be independently operable, but since it is desirable to effect movement of the nozzle-closing units into their operative position coincidentally with opening of the gap 24, and since it is imperative that the gap be opened whenever the nozzle is closed off, the nozzle-closing means and the gap-opening means are preferably operatively interconnected, so that opening of the gap accompanies or effectuates closure of the nozzle, or conversely, closure of the nozzle causes opening of the gap, and vice versa, opening of the nozzle and closure of the gap occur simultaneously. As suggestive of a means to the ends indicated, a cam 6 is fixed in relation to the shiftable annulus 4 (being, for example, mounted upon a fixed element 36 of the strut 3), and projects through an aperture in a lug 56 of the iris actuator ring 51. The formation of the cam 6 is such—see Figure 8—with relation to the extent of axial shifting of the annulus 4 and the nozzle-closing elements mounted thereon, that in the forward, gap-closed positions of the annulus the iris ring 51 is oscillated and held in one limit position, as shown in Figure 8 in full lines, and when shifted to the rearward, gap-open positions, shown in dotted lines in Figure 8, the iris ring is moved to and held in its other limit position. The full-line gap-closed position of Figure 8 corresponds to the position of parts in Figure 7, wherein the nozzle is open, whereas the dotted-line gap-open position of Figure 8 corresponds to the nozzle-closed position of Figure 6. The path of a given iris leaf is illustrated by the broken-line arrow in Figure 8. The shiftable fairing 30 houses the cam 6 and the lug 56; see Figure 2.

Figure 2:
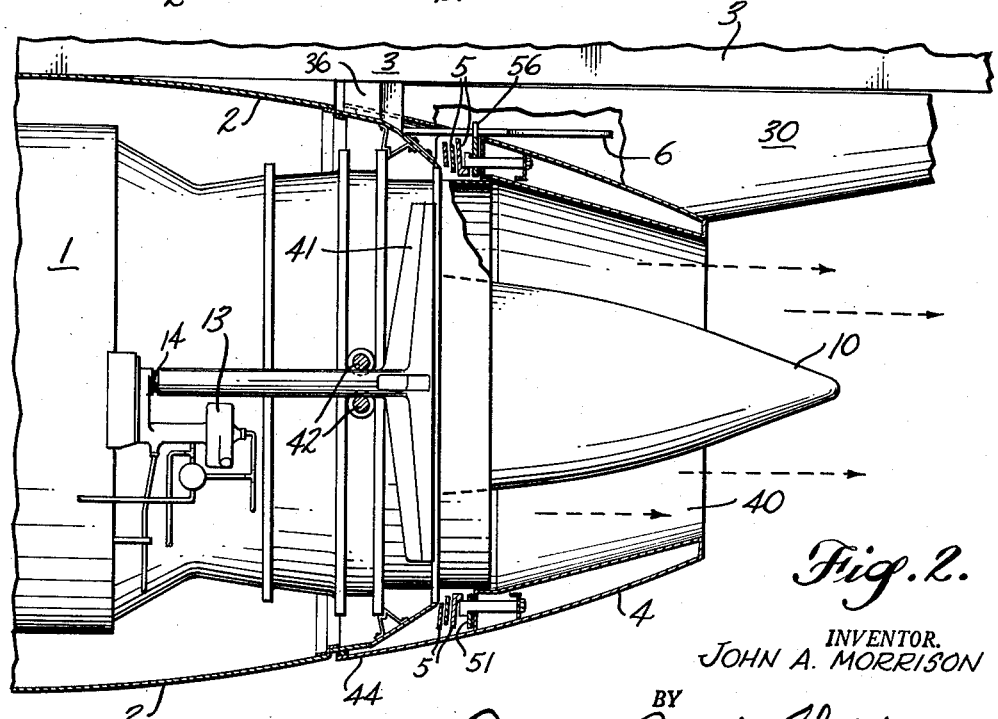
Figure 2 is a similar view, with parts in the position for normal operation of the engine, to develop forward thrust.
Figure 4:
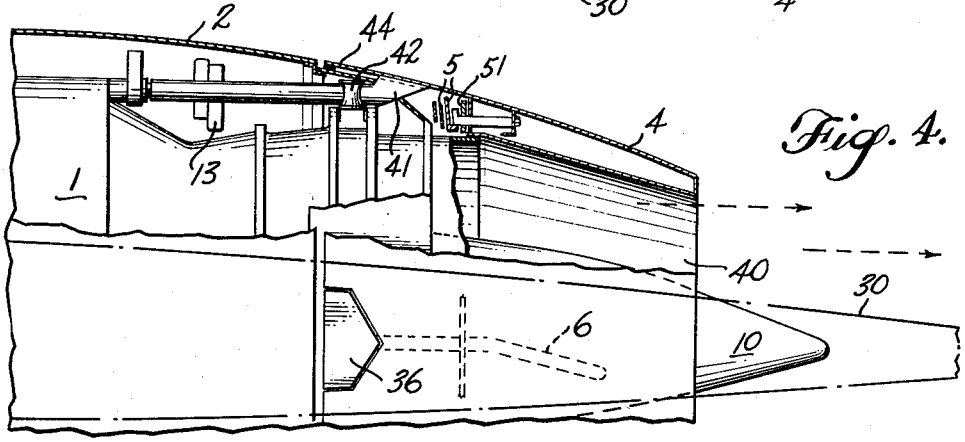
Figure 4 is a similar view, but with the position of parts like that in Figure 2.
Figure 5:
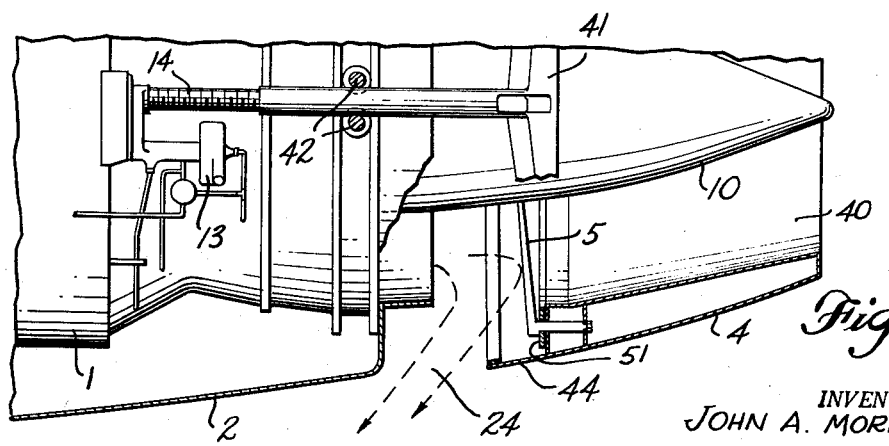
Figure 5 is a view similar to Figure 1, illustrating a modified form of the structure at the exit gap.
Figure 7:
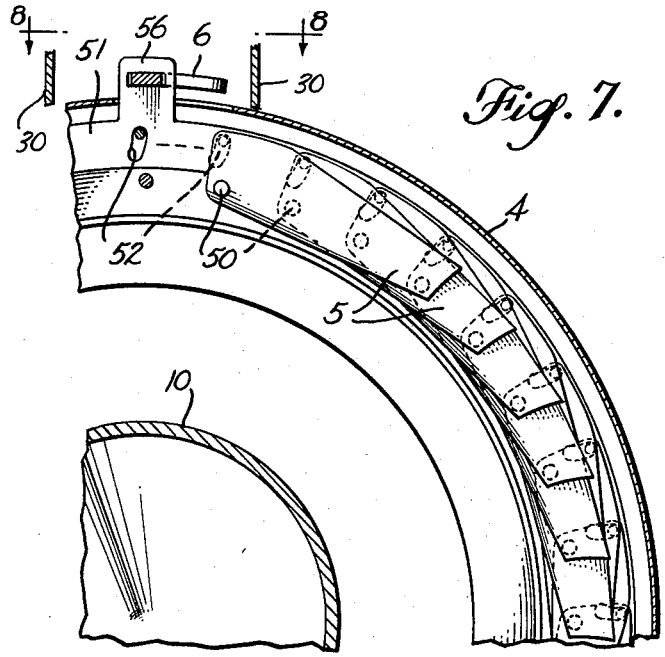
Figure 7 is a similar view with the nozzle-closing units in their open position, for normal operation of the engine.
Figure 8:
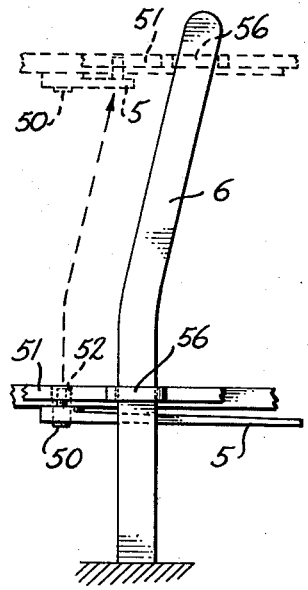
Figure 8 is a detail, in plan view, of the mechanism operatively interconnecting the nozzle-closing actuator and the gap-opening means.

The position of parts during normal flight is as shown in Figures 2, 4, and 7. The gap 24 is closed, so that the gases issue from the combustion chamber 1 by way of the fully open jet nozzle and its rearwardly directed exit at 40. When reverse thrust is required, the annulus 4 is shifted rearwardly by energization of the motor 13. This opens the gap 24 and at the same time moves the iris leaves 5 into nozzle-closing position. They intercept the gases. Since interception is not alone sufficient to produce appreciable reverse thrust, the annulus 4 is formed with a skirt 44 projecting forwardly of the location of the iris leaves, the purpose of which is to contain the intercepted gases and to direct them positively forwardly, before they exit through the gap 24, and to define with the housing terminus 22 or equivalent structure a forwardly directed nozzle. In the gap-closed position of the annulus this skirt 44 constitutes a streamlined rearward continuation of the tapered rear end of the housing 2. The housing may be faired off at 22, generally in line with the direction of issuing gases (Figure 2), or this refinement may be omitted (Figure 5) without apparent detriment. The forwardly directed thrust, reacting from the closed iris leaves and so quite directly from the engine and its strut 3, with the full force of the issuing gases, even though they have not at the point of interception attained their full velocity, very positively and strongly decelerates the aircraft. Shadowgraphs show that the gap 24 is materially restricted by turbulence around the housing's rear terminus, as at 22 or at the equivalent location of Figure 3, creating a venturi effect that speeds up the exiting gases, and they are strongly deflected forwardly. They tend to cling to the housing 2 ahead of the gap, and so the intercepted thrust is directed forwardly to a high degree, rather than outwardly. When the need for thrust reversal is past, the annulus is shifted forwardly to close the gap 24, and simultaneously and automatically the nozzle is reopened.

The advantages of the present invention are believed to arise from the opening of a substantially complete annular gap in the housing, the location of that gap in a zone wherein the gases' velocity is a minimum, the abrupt and substantially complete interception of the gases in a region immediately to the rear of the opened gap, the avoidance of any need to alter the usual circular cross-sectional shape of the housing, the cooperation of the skirt 44 and the rear terminus of the housing in defining a nozzle directed forwardly at the proper time, the simplicity of operative interconnection between the gap-opening and the tail-pipe closing mechanisms, and the convenient form and simplicity of storage of the iris leaves.

I claim as my invention:

1. In a propulsive jet engine, in combination with a fixed structure defining a combustion chamber and a rearwardly directed gas duct, a barrel-like exterior housing surrounding and spaced outwardly of the gas duct, and open at its rear end, an annulus constituting, in its normal position, a rearward extension of said housing defining a jet nozzle in continuation of said gas duct for directing rearwardly the issuing gases, to develop forward thrust, means supporting said annulus for rearward movement relative to the housing from such normal position, to open an annular gap between its forward edge and the rear end of the housing, and for return forward movement, a skirt at the exterior surface of the annulus, projecting forwardly ahead of the location of the gap, a plurality of segmental elements distributed about the annulus, and supported thereon for shifting from an outward inactive position inwardly into a position to block rearward exit of the gases through the jet nozzle, and for return movement of the segmental elements, an actuator ring mounted upon the annulus for angular oscillation relative thereto, as well as axial movement therewith, said ring being operatively connected to each nozzle-closing element, and a cam fixedly supported from and extending generally axially of the fixed structure, and so shaped and operatively engaged with said actuator ring as to oscillate the latter automatically in the sense to effect nozzle-closing movement of the nozzle-closing elements upon rearward movement of the annulus, and vice versa, said barrel-like housing and said skirt while in its normal position providing an annulus space for housing the segmental elements.

2. The combination of claim 1, wherein the nozzle-closing elements are in the form of a cooperating series of iris leaves each pivotally mounted about the annulus, externally of the jet nozzle and gas duct, and the actuator ring is likewise located externally of the jet nozzle and gas duct, for oscillation about the axis of the annulus, to swing the connected iris leaves inwardly and outwardly.

References Cited in the file of this patent

UNITED STATES PATENTS

| 2,509,238 | Martin | May 30, 1950 |
| 2,649,272 | Barbato | Aug. 18, 1953 |
| 2,681,548 | Kappus | June 22, 1954 |

FOREIGN PATENTS

| 103,325 | Great Britain | Jan. 19, 1917 |
| 56,672 | France | July 23, 1952 |
| | (Addition to No. 1,030,483) | |
| 1,020,287 | France | Nov. 12, 1952 |
| 860,754 | Germany | Dec. 22, 1952 |
| 1,092,654 | France | Nov. 10, 1954 |